United States Patent [19]  [11] Patent Number: 5,057,601
Schiessl et al.  [45] Date of Patent: Oct. 15, 1991

[54] PROCESS FOR PRODUCING A GEL-FREE COAGULATED RUBBER WITH LOW ETHYLENIC UNSATURATION

[75] Inventors: Henry W. Schiessl, Northford; Francis W. Migliaro, Jr., Waterbury, both of Conn.

[73] Assignee: Olin Corporation, Cheshire, Conn.

[21] Appl. No.: 432,026

[22] Filed: Nov. 6, 1989

[51] Int. Cl.$^5$ ........................... C08F 6/10; C08F 6/16; C08F 6/24
[52] U.S. Cl. ..................................... 528/483; 524/566; 524/521; 525/339; 525/376; 528/486; 528/491; 528/492; 528/493; 528/496; 528/494
[58] Field of Search ............... 525/376, 339; 524/521, 524/566; 528/483, 486, 498, 483, 486, 491–496; 564/31; 534/838

[56] References Cited

U.S. PATENT DOCUMENTS

| | | | |
|---|---|---|---|
| 3,959,343 | 5/1976 | Arashi et al. | 534/838 |
| 3,969,466 | 7/1976 | Brown et al. | 564/35 |
| 4,317,741 | 3/1982 | Lederle et al. | 252/77 |
| 4,452,950 | 6/1984 | Wideman | 525/339 |
| 4,532,318 | 7/1985 | Abubakari et al. | 528/483 |

*Primary Examiner*—Paul R. Michl
*Assistant Examiner*—T. McDonald, Jr.
*Attorney, Agent, or Firm*—Dale Lynn Carlson

[57] ABSTRACT

This invention relates to a process for making nitrile rubber characterized by being essentially gel-free and at least about 90% saturated. The process comprising reacting an ethylenically unsaturated polymer in latex from, hydrazine, and an oxidant, followed by coagulation and filtration in order to isolate the reduced rubber. The process utilizes a reaction mixture containing a high molar ratio of hydrazine to unsaturated polymer.

8 Claims, No Drawings

PROCESS FOR PRODUCING A GEL-FREE COAGULATED RUBBER WITH LOW ETHYLENIC UNSATURATION

Various forms of hydrogenated nitrile rubbers have recently been introduced into the marketplace. Hydrogenated nitrile rubber has the advantage of being resistant to oxidative degradation a high temperature, as well as being resistant to corrosive environments such as acid environments. These materials have found utility in the manufacture of fan belts, seals, gaskets, and hoses in increasingly small and hot-running car engines.

One process for the production of hydrogenated polymers in latex form, particularly hydrogenated latex rubber, utilizes hydrazine, and oxidant and an unsaturated polymer as the starting materials. This process is more particularly described in U.S. Pat. No. 4,452,950, assigned to the Goodyear Tire and Rubber Company. However, the product produced in accordance with the process described in the '950 patent suffers from two significant disadvantages: (a) the product contains a substantial amount of residual unreacted hydrazine and (b) the product contains a substantial amount of ethylenic unsaturation. The residual hydrazine is considered undesirable from an environmental and/or toxicity standpoint, whereas the unsaturation makes the rubber more subject to degradation during use than might be desired.

In view of the above, it would be highly desirable to provide a process for the production of nitrile rubber which is essentially hydrazine-free and essentially unsaturation-free.

In one aspect, the present invention relates to a process for making nitrile rubber which comprises the steps of:

(a) reacting a reaction mixture containing an unsaturated polymer in latex form, hydrazine, and an oxidant in order to reduce at least about 90% (preferably at least about 95%) of the ethylenic unsaturation in said unsaturated polymer, thereby providing a reduced rubber, the molar ratio of hydrazine to unsaturated polymer being between about 7:1 and about 15:1 or higher, the molar ratio of oxidant to unsaturated polymer being between about 2.0:1 and about 5:1, said oxidant being added gradually to provide a controlled rate of reaction, (b) adding a coagulating agent to said product mixture in order to coagulate the reduced rubber to provide coagulated reduced rubber in said product mixture, and (c) filtering said coagulated reduced rubber in order to isolate said coagulated reduced rubber from said product mixture to provide an essentially gel-free coagulated reduced rubber that is at least about 90 percent (preferably at least about 95%) saturated and a filtrate comprising aqueous hydrazine.

In another aspect, the present invention relates to treating said filtrate with an aldehyde, a ketone, or a mixture thereof in order to convert at least a portion of said aqueous hydrazine in said filtrate to an aqueous aldazine or an aqueous ketazine, or a mixture thereof.

In yet another aspect, the present invention relates to the essentially gel-free coagulated reduced rubber product produced by the above process.

These and other aspects will become apparent upon reading the following detailed description of the invention.

In accordance with the present invention, it has now been surprisingly found that gel-free coagulated reduced rubber is provided by reducing unsaturated polymer in latex form under specific reaction conditions, followed by coagulation of the reduced rubber and filtration to recover the reduced rubber. Without wishing to be bound by any particular theory, the present inventors speculate that a high molar ratio of hydrazine to unsaturated polymer during the rubber reduction is key to achieving a gel-free reduced rubber having a saturation level of at least about 90 percent. The present inventors speculate further that these results are achieved on the basis of a solvent effect by the large amount of hydrazine present during the reduction reaction.

The molar ratio of hydrazine to unsaturated polymer is suitably between about 7:1 and about 15:1, preferably between about 8:1 and about 12:1, most preferably about 10:1.

The hydrazine useful in the process of the present invention can be in the form of either hydrazine hydrate or anhydrous hydrazine, preferably hydrazine hydrate having an aqueous hydrazine concentration of at least about 50%, more preferably the commercially available 64% concentration. During the reduction of step (a) of the process of the present invention, it is preferred that the initial hydrazine concentration in the aqueous phase of the reaction mixture be at least about 20%, more preferably at least about 30%, most preferably at least about 35% based upon the total volume of the aqueous phase.

The unsaturated polymers useful as reactants are typically composed of 5% to 100% by weight of a conjugated diene monomer unit and 95% to 0% by weight of an ethylenically unsaturated monomer unit. Specific examples of the conjugated diene monomer are 1,3-butadiene, 2,3-dimethylbutadiene, isoprene, and 1,3-pentadiene, specific examples of the ethylenically unsaturated monomer include unsaturated nitriles such as acrylonitrile and methacrylonitrile, monovinyl aromatic hydrocarbons such as styrene, (o-, m-, and p-) alkylstyrenes, divinyl aromatics such as divinylbenzene, dialkenyl aromatics such as diisopropenylbenzene, unsaturated carboxylic acids and the esters thereof such as acrylic acid, methacrylic acid, crotonic acid, itaconic acid, maleic acid, methyl acrylate, ethyl acrylate, butyl acrylate, 2-ethylhexyl acrylate and methyl methacrylate; vinylpyridine; and vinyl esters such as vinyl acetate.

The conjugated diene polymer may be one prepared by any method of preparation, such as emulsion polymerization, solution polymerization or bulk polymerization. Specific examples of the conjugated diene polymer include polyisoprene, polybutadiene, a styrene/butadiene (random or block) copolymer, an acrylonitrile/-butadiene (random or blocked) copolymer, a butadiene/isoprene copolymer, and an isoprene/isobutylene copolymer.

The oxidant useful in the process of the present invention is preferably selected from the group consisting of oxygen, air, hydrogen peroxide, and organic hydroperoxides. Typical organic hydroperoxides include cumyl hydroperoxide, p-menthane hydroperoxide, t-buyl hydroperoxide, and the like. If air or oxygen is used as the oxidant, the use of a catalyst is preferred. Useful catalysts include cupric ion and ferrous ion.

The coagulant useful in the process of the present invention can be any conventional coagulant, preferably a soluble salt such as magnesium sulfate, sodium chloride, calcium chloride, sodium sulfate, and the like.

The coagulant is employed in a sufficient amount to cause the reduced rubber to coagulate.

After filtration of the coagulated rubber, the filtrate is preferably treated in order to effect a separation of the hydrazine from the water in the filtrate. Although hydrazine itself is not easily separated from water since it forms a high boiling azeotrope, separation is facilitated by reaction of the aqueous hydrazine with a suitable treating agent to enable the resulting mixture to be separated by physical means such as fractional distillation or decanting. Suitable treating agents include aldehydes and ketones, and mixtures thereof. Preferred treating agents include acetone and 2-butanone.

The reaction Of step (a) Of the process of the present invention is suitably effected at atmospheric or at an elevated pressure, preferably at atmospheric pressure when using the preferred hydrogen peroxide oxidant and preferably at superatmospheric pressure when using a gaseous oxidant. The process is suitably effected at a temperature of between about 20° C. and about 80° C., more preferably between about 20° C. and about 60° C. The reaction time for the process of the present invention can vary over a wide range, but is preferably between about 1 hour and about 50 hours, more preferably between about 1 hour and about 20 hours, most preferably between about 1 hour and about 5 hours.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

EXAMPLE 1

A latex of butadiene/acrylonitrile polymer containing 63% butadiene and 37% acrylonitrile, and having a solids content of 18.5%, was used for hydrogenation. To 75 g of this latex (0.162 moles carbon-carbon double bonds) was added 77.2 mL of 64.2% aqueous hydrazine (1.6 moles, a tenfold excess over theory) and the mixture heated to 35° C. The hydrazine concentration at this point was 36% on a solids-free basis. To this suspension, 40 mL of 30.8% hydrogen peroxide (0.40 moles) was added over a period of 3 hours, with a post-reaction time of 2 hours at 35° C. and an additional reaction period at ambient temperature for 16 hours.

An additional 40 mL of the peroxide was then added at the same rate and reaction temperature, with a post-reaction period of 3 hours and again stirring at room temperature for 16 hours. At this point, the latex contained 15.4% hydrazine, on a solids-free basis. The degree of hydrogenation was 98.6%, that is, all but 1.4% of the carbon - carbon double-bonds had been hydrogenated. The rubber was coagulated from this latex by slowly pouring the latex into 100 ml of 2% magnesium sulfate solution that had been preheated to 65° C., and the temperature during this addition was maintained at 55° C.–65° C. The rubber coagulated as an easily-filtered precipitate. The coagulated rubber product was visually observed to be free of gels as evidenced by its complete solubility in methylene chloride, and the rubber was 98.6% saturated.

After removing the precipitated rubber, the filtrate contained about 39 g (1.2 moles) hydrazine. To this was added 354 g (6.1 moles) acetone, with stirring. An aliquot of the resulting ketazine-containing solution was then distilled to take the ketazine overhead as an aqueous fraction. By adding additional acetone, it was possible to take substantially all the hydrazine overhead as ketazine; 96% of the hydrazine was accounted for.

COMPARATIVE EXAMPLE

To 75 grams of the same latex as used in the prior example, add 19.3 mL of 64.2% aqueous hydrazine (0.4 m, a 2.5 fold excess over theory) and heat to 35° C. The hydrazine concentration at this point is 15.8%. To this suspension, add 41.6 mL of 29.5% hydrogen peroxide (0.4 m, a 2.5 fold excess over theory) uniformly over a period of 3.8 hours and then an additional 10 mL of the peroxide (0.1 m) uniformly over a 16 hour period at 35° C. The resulting degree of hydrogenation was 97%. The polymer latex was heavily gelled, as evidenced by insolubility in methylene chloride. This is in sharp contrast to the latex of the previous example which was hydrogenated to 98.6% but showed no trace of gels in methylene chloride.

WHAT IS CLAIMED IS:

1. A process for making nitrile rubber which comprises the steps of:
    (a) reacting a reaction mixture containing an ethylenically unsaturated polymer in latex form, hydrazine, and an oxidant in order to reduce at least about 90% of the ethylenic unsaturation in said unsaturated polymer, thereby providing a reduced rubber, the molar ratio of hydrazine to unsaturated polymer being between about 7:1 and about 15:1, the molar ratio of oxidant to unsaturated polymer being between about 2.0:1 and about 5:1, said oxidant being added gradually to provide a controlled rate of reaction,
    (b) adding a coagulating agent to said product mixture in order to coagulate the reduced rubber to provide coagulated reduced rubber in said product mixture, and
    (c) filtering said coagulated reduced rubber in order to isolate said coagulated reduced rubber from said product mixture to provide an essentially gel-free coagulated reduced rubber that is at least about 90 percent saturated and a filtrate comprising aqueous hydrazine.
2. The process of claim 1 which comprises the additional step of:
    (d) treating said filtrate with an aldehyde, a ketone, or a mixture thereof in order to convert at least a portion of said aqueous hydrazine in said filtrate to an aqueous aldazine or an aqueous ketazine, of a mixture thereof.
3. The process of claim 1 wherein said molar ratio of aqueous hydrazine to unsaturated polymer is between about 8:1 and about 12:1.
4. The process of claim 1 wherein said essentially gel-free coagulated reduced rubber is at least about 95 percent saturated.
5. The process of claim 1 wherein step (a) is effected at a temperature of between about 0 C. and about 80 C. and atmospheric pressure.
6. The reduced rubber produced by the process of claim 1 which is characterized by being essentially gel-free and at least about 90% saturated.
7. The reduced rubber produced by the process of claim 1 which is characterized by being essentially gel-free and at least about 95% saturated.
8. The process of claim 2 wherein step (d) is conducted with acetone or 2-butanone as a treating agent.

* * * * *